J. W. DYAR.
TIRE TOOL.
APPLICATION FILED AUG. 6, 1913.
1,098,488.
Patented June 2, 1914.
2 SHEETS—SHEET 2.
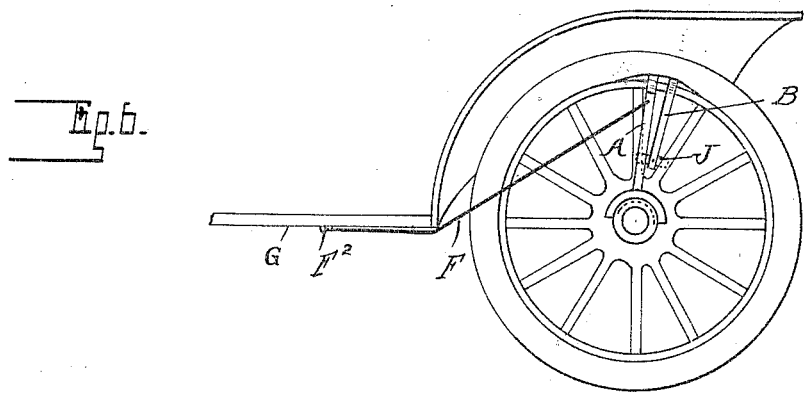
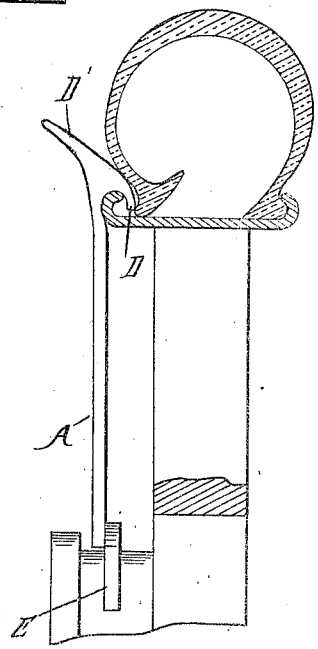
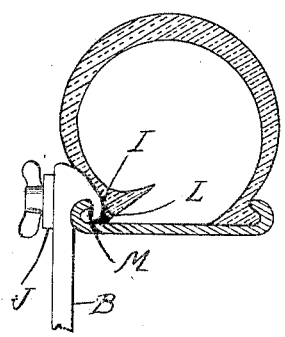
Witnesses
W. K. Ford
C. B. Belknap
Inventor
John W. Dyar

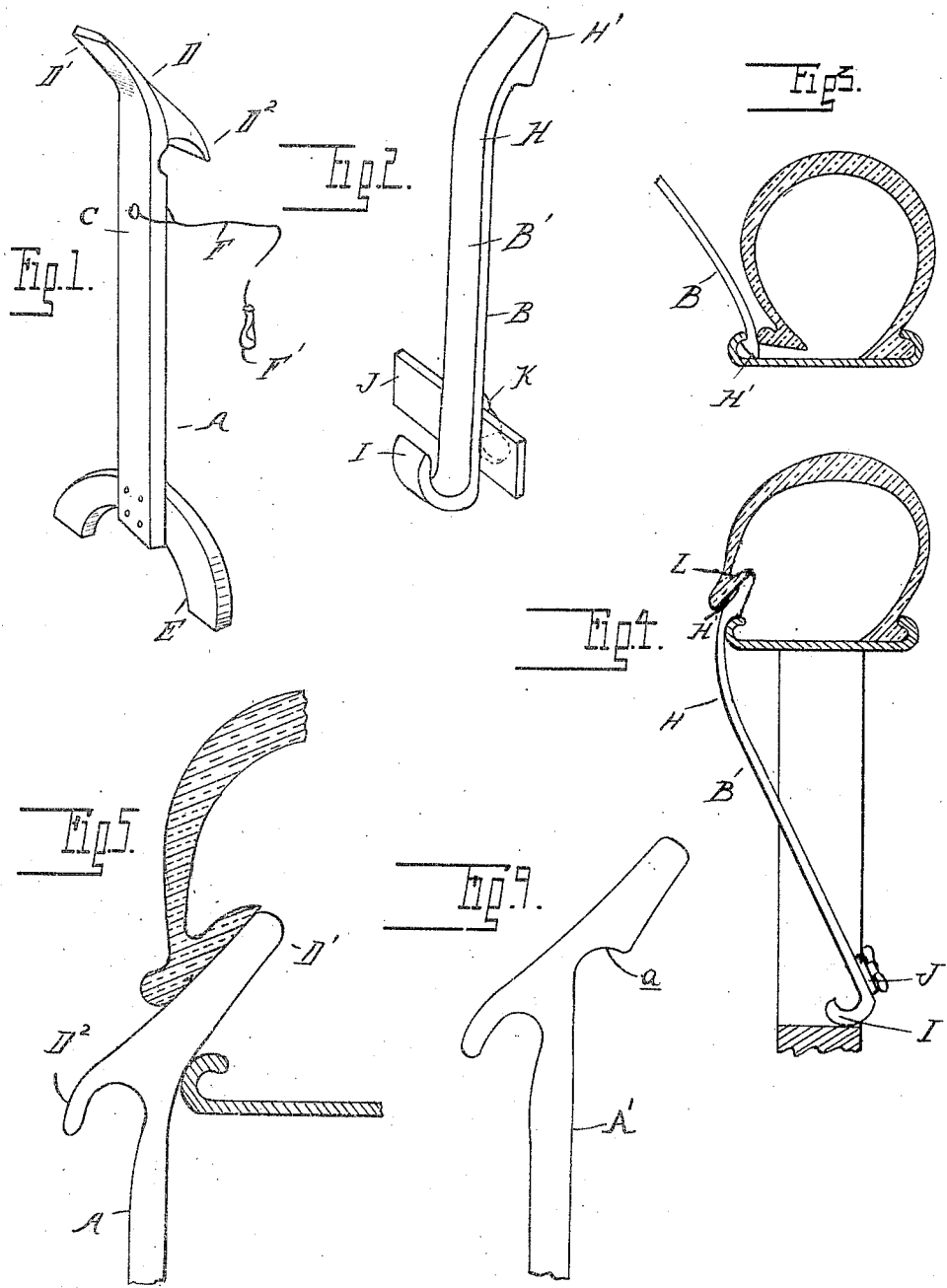

UNITED STATES PATENT OFFICE.

JOHN W. DYAR, OF DETROIT, MICHIGAN.

TIRE-TOOL.

1,098,488. Specification of Letters Patent. Patented June 2, 1914.

Application filed August 6, 1913. Serial No. 783,361.

*To all whom it may concern:*

Be it known that I, JOHN W. DYAR, a citizen of the United States of America, residing at Detroit, in the county of Wayne and State of Michigan, have invented certain new and useful Improvements in Tire-Tools, of which the following is a specification, reference being had therein to the accompanying drawings.

The invention relates to apparatus for the engagement and disengagement of pneumatic tires, being particularly adapted for use in connection with tires of the clencher type.

It is the object of the invention; first, to provide an apparatus by which the tire may be engaged or removed with slight effort on the part of the operator; further, to perform the operation without detrimental effect upon the tire; and third, to obtain a simple and inexpensive construction.

In the drawings: Figure 1 is a perspective view of the main tool, forming a part of the apparatus; Fig. 2 is a similar view of the auxiliary tool; Fig. 3 is a cross section through the clencher rim and tire, showing the initial engagement of the auxiliary tool in the operation of detaching the tire; Fig. 4 is a similar view, showing the full engagement of the auxiliary tool; Fig. 5 is a similar view showing the main tool in engagement with the tire; Fig. 6 is a side elevation of a portion of the motor vehicle, showing the wheel and the apparatus in initial engagement for removing the tire; Fig. 7 is a view similar to Figs. 3 to 5, showing the engagement of the auxiliary tool for replacing the tire; and Fig. 8 shows the main tool engaged for replacing the tire.

My apparatus is designed for removing and replacing the tires by a novel method and one in which the labor involved in the usual practice is almost completely eliminated. One of the novel features of the method is the anchoring of the main tool and the movement of the wheel and rim instead of the manipulation of said tool on a stationary wheel and rim, which is the usual practice. Another novel feature of the method is the utilization of the power of the motor in turning the wheel, this being especially advantageous in the engagement or disengagement of large and heavy tires.

As shown in Figs. 1 and 2, A is the main tool, and B is the auxiliary tool. The main tool is provided with a shank portion C and a head portion D presenting an inclined face, and also portions D' and D² projecting oppositely from the shank. The opposite end of the shank is preferably provided with a bifurcated bearing E adapted to embrace the wheel hub and prevent lateral movement of the bifurcated end of the shank. Intermediate the head and the bifurcated portion there is attached to the tool an anchoring connection F, preferably a flexible cable, the opposite end of this connection being detachably engageable with some stationary part of the machine, as for instance the running board G. Thus the tool, when engaged, will be held from movement, and the tire may be engaged or disengaged by a rotation of the wheel, as hereinafter described.

The auxiliary tool B is provided at its opposite ends with portions for engagement with the tire, respectively when the latter is to be detached and replaced. One end H is preferably curved, as shown, and is provided with the rounded shoulder H' for hooking over the rim flange in initially engaging the tire to detach the same. The opposite end of the tool is formed with the return-bent hook I which may be placed over the rim flange and engaged with the tire when the latter is to be replaced. This tool is also provided with means for temporarily holding it in fixed relation to the wheel, consisting of a cross bar J that is pivotally connected to the tool B so as to be turned to permit it to be inserted between the spokes.

The tools being constructed as described, the operation of removing a tire is as follows: The inner tube of the tire being first deflated, the operator engages the auxiliary tool B by inserting it between the tire case and clencher rim flange, as shown in Fig. 3. The tool is then turned upon the shoulder H', as a fulcrum, into the position shown in Fig. 4, where a portion of the bead L of the tire case is raised to clear the rim flange and is deflected laterally outside of the plane of said flange. The cross bar J is then turned to engage two of the spokes of the wheel, as shown in Fig. 6. The operator then engages the main tool A by inserting the projecting end D' thereof between the bead of the tire case and the flange of the rim, adjacent to the auxiliary tool B, and by then turning the tool into the position shown in Fig. 5, the bifurcated portion E thereof may be engaged with the hub of the wheel. The flexible anchoring connection F is then attached to the running board, preferably by means of a hook F' at the free end thereof, which engages a staple F² or other attachment means. The parts are now in position for the removal of the tire, which is accomplished by rotating the wheel. This will carry the auxiliary tool B around with it, but the main tool A being anchored will remain stationary, and the inclined face D thereof will operate as a plow or deflector for progressively forcing the bead of the tire case over the clencher rim and into the plane of the portion engaged by the auxiliary tool which is outside of the rim flange.

Where the operation is performed upon relatively small and light tires the turning of the wheel may be performed by hand, the axle being jacked up in the usual manner. On the other hand, with large and heavy tires the effort required to turn the wheel may be avoided by permitting the wheel to rest upon the ground and moving the vehicle by its own motor. When this latter method is used, the wheel will rotate until the auxiliary tool, which initially is placed at the top, is turned to the bottom, and by reason of the shape of this tool, when its nose presses upon the ground it will be forced out of its clamping engagement, thereby avoiding any pressure upon the inner tube or case that might injure the same. When the wheel is turned sufficiently to detach the bead of the case from one rim flange, the axle is jacked up and the inner tube or case may then be removed without effort.

For replacing a tire case upon a wheel, the same tools are employed, but are arranged in a different manner. Thus, as shown in Fig. 7, the auxiliary tool is engaged by hooking the return-bent portion I over the flange M of the clencher rim, which operation will force a portion of the bead L laterally inward and hold the same in a plane inside of that of the flange. The main tool A is then engaged in reverse position—that is, with the lower projecting end D² of the incline inserted between the rim flange and the bead, as shown in Fig. 8. The wheel is then rotated by either the hand or power method above described, and the inclined face D of the main tool will operate as a plow or deflector for forcing the bead of the tire case over the rim and into the plane of the portion held by the auxiliary tool.

While I have described the use of a main and auxiliary tool, the latter is not absolutely essential, as the function performed is merely holding a portion of the tire case in the desired plane so that it will not slip out of position during the progressive movement of the main tool. This function insures the satisfactory operation of the main tool, but it is obvious that it might be dispensed with and the one tool only used.

When the tool A is in the position shown in Fig. 5 the bifurcated portion E is fulcrumed upon the hub, but when the member A is arranged to engage the tire with the rim, as shown in Fig. 8, the tool is supported from the rim flange by the hooked portion D². If desired, the main tool may also be supported from the rim flange when arranged to detach the tire case. Thus as shown in Fig. 9, the tool A' is provided with a grooved shoulder or seat $a$ which is adapted to engage the rim flange and support the member A' therefrom. With both constructions of the main tool the bifurcated portion E serves to prevent lateral movement of the main tool in relation to the wheel.

When the tire case is to be entirely removed, after disengaging one bead as hereinbefore described, the operator may loosen the other bead from the rim flange and force the same by means of the tool B into engagement with the incline face D of the main tool. Relative movement of the tire case and the main tool is then effected, which will completely disengage the case from the rim. Similarly when the case is to be initially engaged with the rim, one bead thereof may be plowed onto the rim in a manner similar to engaging the bead with the rim, as described in connection with Figs. 7 and 8, and after the inner tube has been inserted in the case, the other bead engaged with the rim flange as hereinbefore described.

What I claim as my invention is:

1. In an apparatus for engaging and disengaging tire cases from wheel rims, a tool comprising a shank portion and oppositely-extending flanges at one end thereof, forming a continuous inclined face adapted to be alternatively engaged reversely facing between the rim flange and tire bead, and a bearing at the opposite end of said shank for pivotally engaging the wheel hub.

2. A tool for engaging and disengaging tire cases and wheel rims, comprising a member having a shank portion provided with a portion for engaging the hub of the wheel and having removing and replacing bearings adapted to be alternatively used upon reversing the shank, each of said bearings having inclined tire-engaging surfaces respectively inclining oppositely from the shank.

3. A tool for engaging and disengaging tire cases and wheel rims, comprising a member formed of a single casting having a shank portion provided at one end with a bearing portion for engaging the hub of the wheel and having tire-removing and tire-replacing bearings provided respectively with portions extending upon opposite sides of the shank, and having tire-engaging surfaces inclining oppositely from the shank, said bearings being adapted for alternate use upon reversal of the shank.

4. A tool for engaging and disengaging tire cases and wheel rims, comprising a member having a shank portion provided with a portion for engaging the hub of the wheel and having removing and replacing bearings adapted to be alternatively used upon reversing the shank, each of said bearings having inclined tire-engaging surfaces respectively inclining oppositely from the shank, and means for anchoring said tool to a portion of the vehicle, for the purpose described.

In testimony whereof I affix my signature in presence of two witnesses.

JOHN W. DYAR.

Witnesses:
WM. J. BELKNAP,
C. B. BELKNAP.